(12) United States Patent
Shah et al.

(10) Patent No.: US 11,410,181 B2
(45) Date of Patent: Aug. 9, 2022

(54) EVENT PREDICTION USING ARTIFICIAL INTELLIGENCE

(71) Applicant: HIGHRADIUS CORPORATION, Houston, TX (US)

(72) Inventors: Vishal Shah, Kandivali (W) (IN); Sonali Nanda, Miyapur (IN); Srinivasa Jami, Telangana (IN)

(73) Assignee: HighRadius Corporation, Houston, TX (US)

( * ) Notice: Subject to any disclaimer, the term of this patent is extended or adjusted under 35 U.S.C. 154(b) by 30 days.

(21) Appl. No.: 16/411,566

(22) Filed: May 14, 2019

(65) Prior Publication Data

US 2020/0265443 A1 Aug. 20, 2020

(30) Foreign Application Priority Data

Feb. 15, 2019 (IN) .............................. 201941006159

(51) Int. Cl.
| | |
|---|---|
| *G06Q 30/00* | (2012.01) |
| *G06Q 10/04* | (2012.01) |
| *G06Q 20/42* | (2012.01) |
| *G06Q 20/10* | (2012.01) |
| *G06F 9/54* | (2006.01) |

(52) U.S. Cl.
CPC .......... *G06Q 30/016* (2013.01); *G06Q 10/04* (2013.01); *G06Q 20/102* (2013.01); *G06Q 20/42* (2013.01); *G06F 9/542* (2013.01)

(58) Field of Classification Search
USPC ..................................................... 705/38, 35
See application file for complete search history.

(56) References Cited

U.S. PATENT DOCUMENTS

| | | | |
|---|---|---|---|
| 8,533,082 B1 * | 9/2013 | Sudjianto ............... | G06Q 40/00 705/35 |
| 2005/0177414 A1 * | 8/2005 | Priogin .................. | G06Q 10/06 706/21 |
| 2009/0043689 A1 * | 2/2009 | Yang ...................... | G06Q 30/04 705/38 |
| 2011/0295631 A1 * | 12/2011 | Kennedy ................ | G06Q 40/06 705/7.11 |
| 2014/0172659 A1 * | 6/2014 | Kennedy ................ | G06Q 40/02 705/35 |

(Continued)

*Primary Examiner* — William E Rankins
(74) *Attorney, Agent, or Firm* — Adsero IP

(57) ABSTRACT

Provided techniques manage and predict future events. For example, in a payment implementation, a supplier, at any given point in time, has multiple customer debtors that may owe payments (e.g., have outstanding invoices). Utilizing historical attributes for a given customer debtor payment predictions may be determined. By analyzing outstanding debts associated with this debtor customer an amount owed may be calculated and a predicted payment (e.g., a payment that has not yet been indicated by that debtor customer) created. Events may be provided to a second system to correlate predictions across multiple debtor collectors. Correlated information may be used to predict cash flow needs of an organization. Alternatively, optimization of help desk systems may be provided based on predictions from analysis of multiple events in an Event-driven feed back system. Provided techniques may be generalized to other applications as well.

19 Claims, 15 Drawing Sheets

(56) References Cited

U.S. PATENT DOCUMENTS

| | | | |
|---|---|---|---|
| 2017/0124631 A1* | 5/2017 | Bhandari | G06Q 30/0633 |
| 2018/0012143 A1* | 1/2018 | Hansen | G06Q 10/00 |
| 2018/0232814 A1* | 8/2018 | Dey | G06Q 40/12 |
| 2020/0143348 A1* | 5/2020 | Collares | G06N 7/005 |

* cited by examiner

EVENT PREDICTION USING ARTIFICIAL INTELLIGENCE

CROSS-REFERENCE TO RELATED APPLICATIONS

This application claims the benefit of Indian Appl. No. 201941006159, filed Feb. 15, 2019. This application is incorporated herein by reference in its entirety to the extent consistent with the present application.

BACKGROUND

An event in a computer system may be used to represent an identifiable occurrence which could be significant for a particular computer application executing on one or more computing systems. Computer systems include hardware, software or both. In most instances, events may be generated algorithmically via the operation of a mechanical process or computing system, or intuitively via direct and/or indirect interaction with a user. An event-driven system is one example category of computing system. Other categories may include queue-based systems or batch processing systems. In an Event-driven system, events (or messages) may be used by one or more component(s) of hardware and/or software to indicate that an action may be expected on the part of a computer process (e.g., a process executing on a computer system as controlled by an operating system).

Some event-driven systems may be one-way channels for the generation of events that are sometimes acted upon without feedback. Other event-driven systems may be interactive, with the generation of events initiating generation of additional but corresponding events that may be sent back to the original event source (e.g., a feedback to an original event) for handling (e.g., as a response message via an event). Event-driven systems of different possible types may be built for immediate event handling. Alternatively, an event-driven system may be built with an expectation of time for the handling of an event (other implementations are also possible). With respect to a two-way event-driven system (e.g., a system with responsive feedback), events may arrive prior to being ready to be handled by the receiving system. Sometimes an unexpected arrival of an event response may result in undesired effects in event handling.

Disclosed systems and techniques address the above problems and others, in part, by utilizing historical information, machine learning, and artificial intelligence to address feedback timing with respect to automated event loops for expected response times and abnormal response events.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other.

For a detailed description of various examples, reference will now be made to the accompanying drawings, in which.

DETAILED DESCRIPTION

Figure 1A:
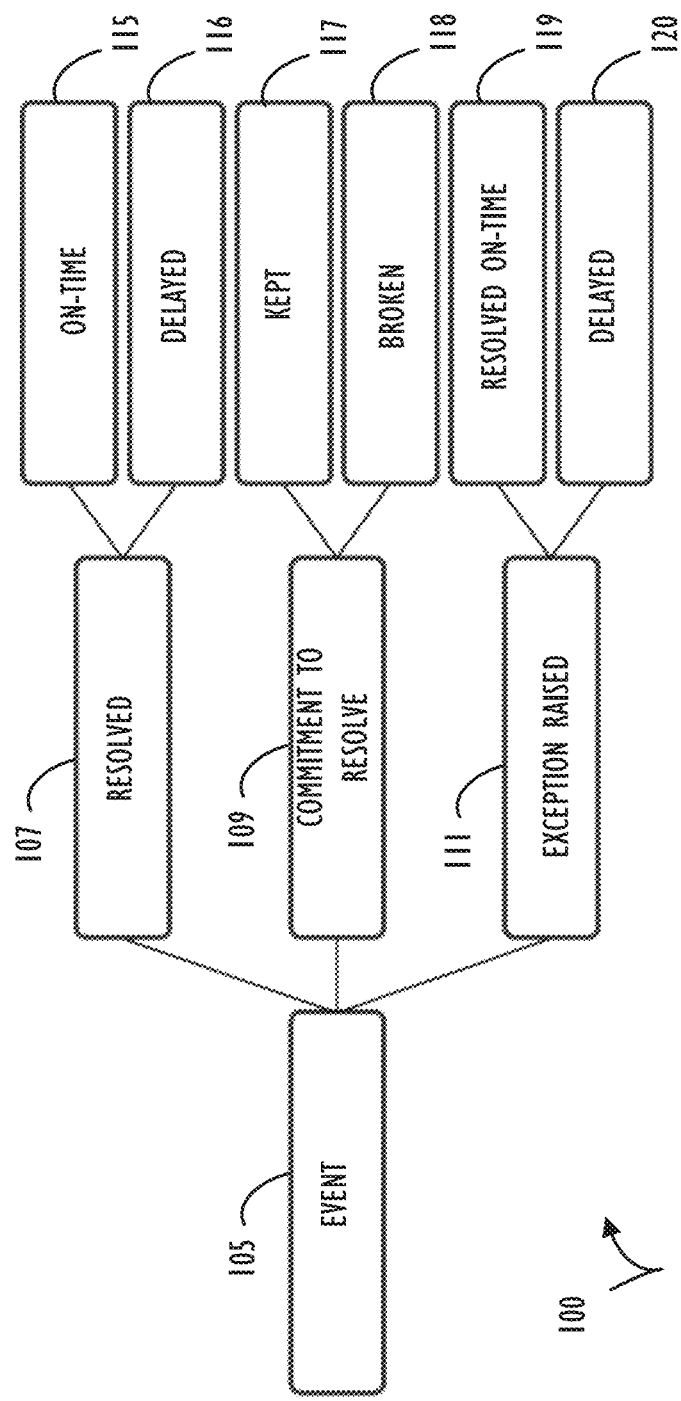
FIG. 1A illustrates an example breakdown of a possible life-cycle for an event, according to one or more disclosed implementations.

Illustrative examples of the subject matter claimed below will now be disclosed. In the interest of clarity, not all features of an actual implementation are described in every example used in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

What is needed to address the above-mentioned problems is a system which can record information on the timeliness of event responses. For example, a system that may use information about timeliness of response and extrapolate, over a period of time, to form a prediction of when the generation of response events may result in a more reliable outcome. Additionally, such a system might incorporate a capability to create recommendations on the appropriate timeliness of events. For example, recommendations based on feedback information obtained or derived from historical event processing. Such recommendations may further be delivered for consideration and conditional use by users acting as system administrators, or algorithmically employed by the responding computer system in an automated fashion.

One example of a computer system that may be implemented using event generation and response techniques is an accounting system. In an accounting system, accounts receivable (A/R) represents the dollar value of business that a company has transacted for which it has not yet received payment. This expected cash flow appears on the "assets" side of a balance sheet. However, it is not uncommon for mismanaged cash by an entity to create a cash flow issue for that entity. Thus, a poorly managed A/R system may provide impediments to an organization that manages complex financial situations. This disclosure introduces techniques to use an event generation/response computer system, augmented with artificial intelligence (AI) techniques, to address one or more problems of an A/R system. For example, some implementations of this disclosure assist in reducing outstanding receivables through improved collections strategies. Disclosed techniques further illustrate how Machine Learning (ML) and AI, using historical data from accounts receivable transactions, may be used with respect to A/R financials to make predictions that are more accurate than traditional estimation metrics, such as Average Days Delinquent (ADD). In short, disclosed techniques improve and enhance the collections process and other aspects of computer implemented accounting systems, in part, by improving the functioning of the computer system tasked to support an A/R function.

In today's corporate credit environment, a supplier sells goods to a buyer; however, the buyer does not always pay upfront and instead may use some sort of credit-based payment system. In many cases, there are contracts in place for a buyer to pay an invoiced amount after a stipulated period. In collection's terminology, this is sometimes referenced as "due date." For example, sales where the payment is not done as soon as the invoice is generated may be referred to as "credit sales." A single supplier will likely have multiple buyers that are associated with multiple invoices that may be generated on a daily basis or multiple times in a given month. This disclosure presents techniques to implement a computer-based system to assist a collector (and therefore the seller) in managing payments with respect to one or more outstanding (e.g., not yet paid or reconciled) invoices. Disclosed techniques may also utilize AI techniques to provide predictions (i.e., future guesses) of possible payment at a per user (buyer also referred to as a customer debtor) level.

A seller that generates many invoices may have a dedicated team to manage collectibles in the form of Accounts Receivable (AR) that are managed by collectors (i.e., the team). Each of the collectors and the team in general, have a goal of collecting as much money as possible and as soon as possible. In general, an efficient collections process assists a business with managing cash flow and protecting the business from unexpected events such as a buyer filing bankruptcy (or the like).

Historically, collections processes have been largely reactive and manually intensive. Further, traditional systems may react to due dates as the pivot to initiate dunning activity (e.g., demands or follow up requests for payments). Accordingly, traditional systems are not as efficient and reliable as may be possible. This disclosure presents an improvement to the function of a computer system with respect to A/R processing. Further, disclosed techniques are not limited to A/R processing. Disclosed techniques may be generally applicable to any system that utilizes an event feedback loop where timing of a response event (e.g., the response event to close the loop based on an originally generated event) may have a variable response. The variability of the response may be based on, for example, activities outside the scope of the event-based system. Specifically, response events that rely on an action taken by a user in a help-desk scenario or a customer with respect to paying an outstanding invoice. In the help-desk scenario, it may not be possible to close a trouble ticket until a user provides feedback with respect to a previously applied update to their system. That is, the user may have to execute a diagnostic (or otherwise become satisfied that their issue is solved) before the trouble ticket may be closed. In this situation, the help desk attendant relies upon the user to complete an action and respond with information regarding the results of that action for the help desk attendant's "outstanding tickets" queue to be reduced.

In the context of an A/R system, an initiating event for an event loop may be considered to be generated when an invoice is sent to a consumer. Alternatively, an initiating event may be based on an invoice due date (or a due date being shifted into a larger aging bucket as described in more detail below with reference to FIG. 5). In any case, initiating events in a two-way event system may be closed when a corresponding response event is provided.

The majority of collections operations, including account prioritization, correspondence strategies, and customer collaboration, are typically based on static parameters such as aging bucket and invoice value. As a result, a cluttered collections worklist (e.g., collection tasks) may be presented to a collections analyst. Inefficient identification of delinquent accounts and wasted collections efforts may result from such improperly prioritized set of tasks for the collections analyst. Further, due to the absence of a scalable collections process of previous systems, which may fail to consider dynamic parameters, the collections team may focus only past due A/R. Thus, overall team productivity may be reduced due to labor-intensive, time-consuming, low-value tasks. Tasks performed by a collections analyst, using a system without the benefits of this disclosure, may include enterprise resource processing (ERP) data extraction, manual worklist creation, and correspondence with non-critical customers. The key fallouts of an inefficient workflow may include a slower cash conversion cycle, increasing Days Sales Outstanding (DSO), inefficient processes and higher operational costs.

Disclosed systems may allow transition from a reactive to a proactive collections process. Specifically, using ML "under the hood," the collections team may be able to leverage high-impact predictions to enhance collections output and key performance indicators (KPIs) such as DSO and Collection Effectiveness Index (CEI). Predicting payment date and delay, using a system of this disclosure, may further consider dynamic changes in customer behavior when formulating dunning rules and strategies. Further, customer collaboration could be tailored and personalized by analyzing customer preferences in terms of time, day of the week, and mode preferred for communication and with insights on identifying which dunning letters work best for each customer.

In some disclosed implementations, one or more ML algorithms may be used to identify relevant variables and analyze valuable patterns in the collections cycle to make an educated guess on the payment date for each customer. ML techniques may be used, in conjunction with AI, to process, analyze, and identify patterns discernable from within a potentially large volume of historical data available for each customer. As a result, disclosed techniques may be able to predict the payment date at an invoice level for all customers and help the collections teams become proactive through improved dunning strategies.

Referring to FIG. 1A, an example path 100 to follow with respect to an event resolution life-cycle is illustrated, according to one or more disclosed implementations. The life-cycle of this generic event represents actions taken from initial event generation until ultimate resolution. Actions may include generating one or more sub-events that each may have their own (possibly independent) life-cycle. Example path 100 represents a general event life-cycle that may be used for any two-way event processing system that relies on external events for ultimate resolution. As mentioned above, one example of such a system may be a help-desk where a trouble ticket represents initial event 105. After the event is generated, the help-desk attendant may apply a patch to correct a computer defect. Application of the patch, in this example, may result in flow to resolved block 107 and an attribute of this resolution may reflect that the resolution was supplied either in an acceptable amount of time (e.g., ON-TIME block 115) or may have been outside of a service level agreement (SLA) and thus reflect a delayed status (e.g., DELAYED block 116).

Alternatively, the trouble ticket may require an action on the part of a user for which the patch is being applied. Thus, the user may provide the help-desk attendant with a commitment to resolve as illustrated in block 109. In this example, the commitment to resolve may be an action such as a test that the user must perform to validate the patch by a promised date/time. Flow in this path may continue to either block 117 where the user "kept" their commitment to resolve (i.e., completed the test as promised) or may continue to block 118 where the user failed to perform their action as promised (i.e., a broken promise). In yet another example, block 111 indicates that an exception may be raised. In this example, the user may be out of the office unexpectedly (e.g., they did not take this absence into account when the commitment was provided, or some other factor may cause the exception). In any case, after exception at block 111, flow may still continue to block 119 where the original event is resolved on-time or flow may continue to block 120 to represent a delay in resolution.

Figure 1B:
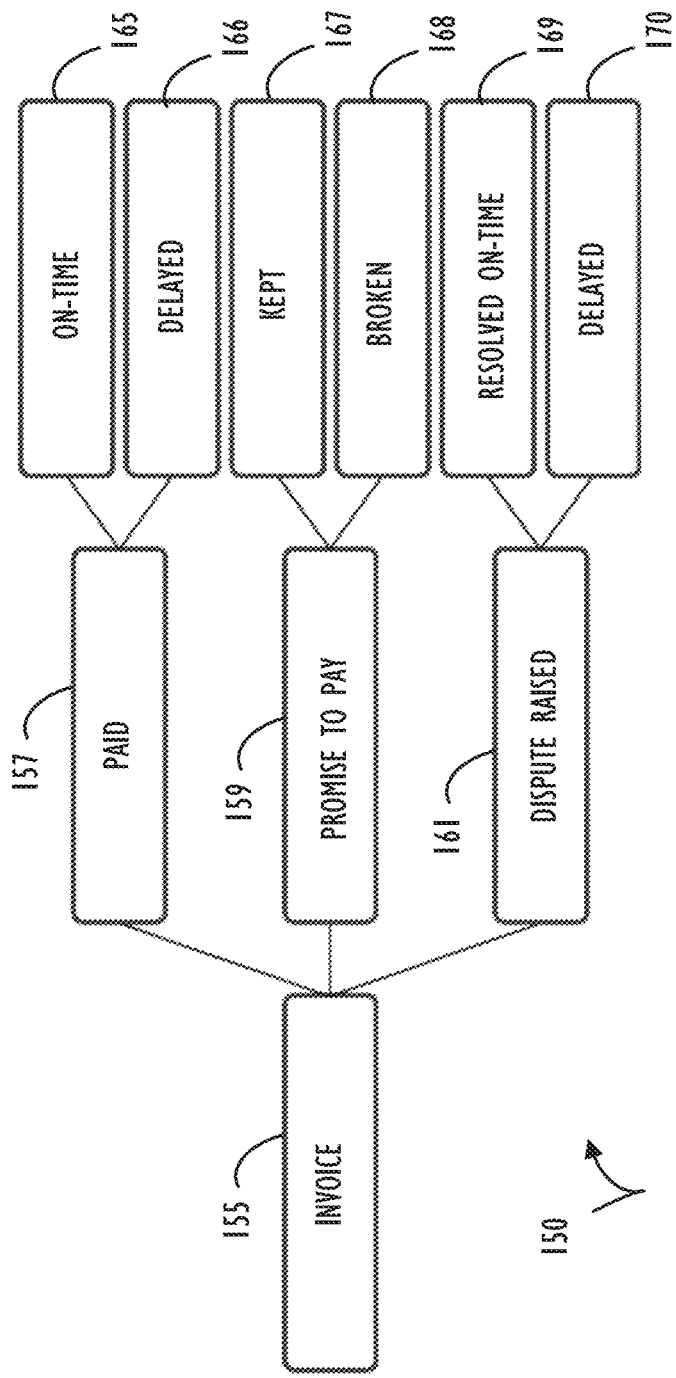
FIG. 1B illustrates an example breakdown of a possible life-cycle for an event within a payment processing system, according to one or more disclosed implementations.

Referring to FIG. 1B, an example path 150 to follow with respect to event a resolution life-cycle for an invoice of an A/R system is illustrated, according to one or more disclosed embodiments. The life-cycle of this invoice event represents actions taken from initial invoice generation until ultimate resolution (e.g., in the form of a payment or deduction). In a similar manner to example path 100, example path 150 indicates that actions may include generating one or more sub-events that each may have their own (possibly independent) life-cycle. Example path 150 represents an invoice event life-cycle may be implemented using a two-way event processing system that relies on external events (e.g., payment or further information from a customer) for ultimate resolution. In the context of the invoice life-cycle of example path 150, after the invoice is generated, the customer may simply pay the invoice. This payment may result in flow to PAID block 157 and an attribute of this resolution may reflect that the payment was supplied either in an acceptable amount of time (e.g., ON-TIME block 165) or may have been outside of a payment period (sometimes referred to as grace period) and thus reflect a delayed status (e.g., DELAYED block 166).

In general, an invoice event requires an action on the part of a customer to which the invoice is provided. Sometimes, automated payment systems may automatically pay invoices and in other cases an interactive action may be required on the part of the customer to cause payment to happen. In one simple example, a customer may have an automatic payment system that habitually provides payment after the due date but within the grace period. Accordingly, having a collections analyst contact that customer on the due date would likely be a waste of effort on the part of the collections analyst. Thus, historical analysis may be used for this customer (as discussed in more detail below) to lower the priority of required action on the part of the collections analyst for this customer. However, if the system recognizes that this customer "always" pays 5 business days after the due date and the outstanding debt is 7 days delinquent, a contact for this customer may rise to a very high priority. In general, abnormal interactions with different customers may be taken into account (e.g., using ML and AI) to set proper priorities for a collections analyst to achieve efficient results.

Continuing with example path 150, the user may provide the collections analyst with a commitment to resolve, which for an invoice may be a promise to pay on a certain date, as illustrated in block 159. Flow in this path may continue to either block 167 where the customer "kept" their commitment to resolve (i.e., paid the invoice as promised) or may continue to block 168 where the user failed to perform their action as promised (i.e., a broken promise to pay). In yet another example, block 161 indicates that an exception may be raised. In this example, exception may be a dispute in the invoice amount or a failure of delivery for services/goods expected on the part of the customer. In any case, after exception at block 161, flow may still continue to block 169 where the invoice payment is received on-time or flow may continue to block 120 to represent a delay in payment of the invoice.

Figure 2A:
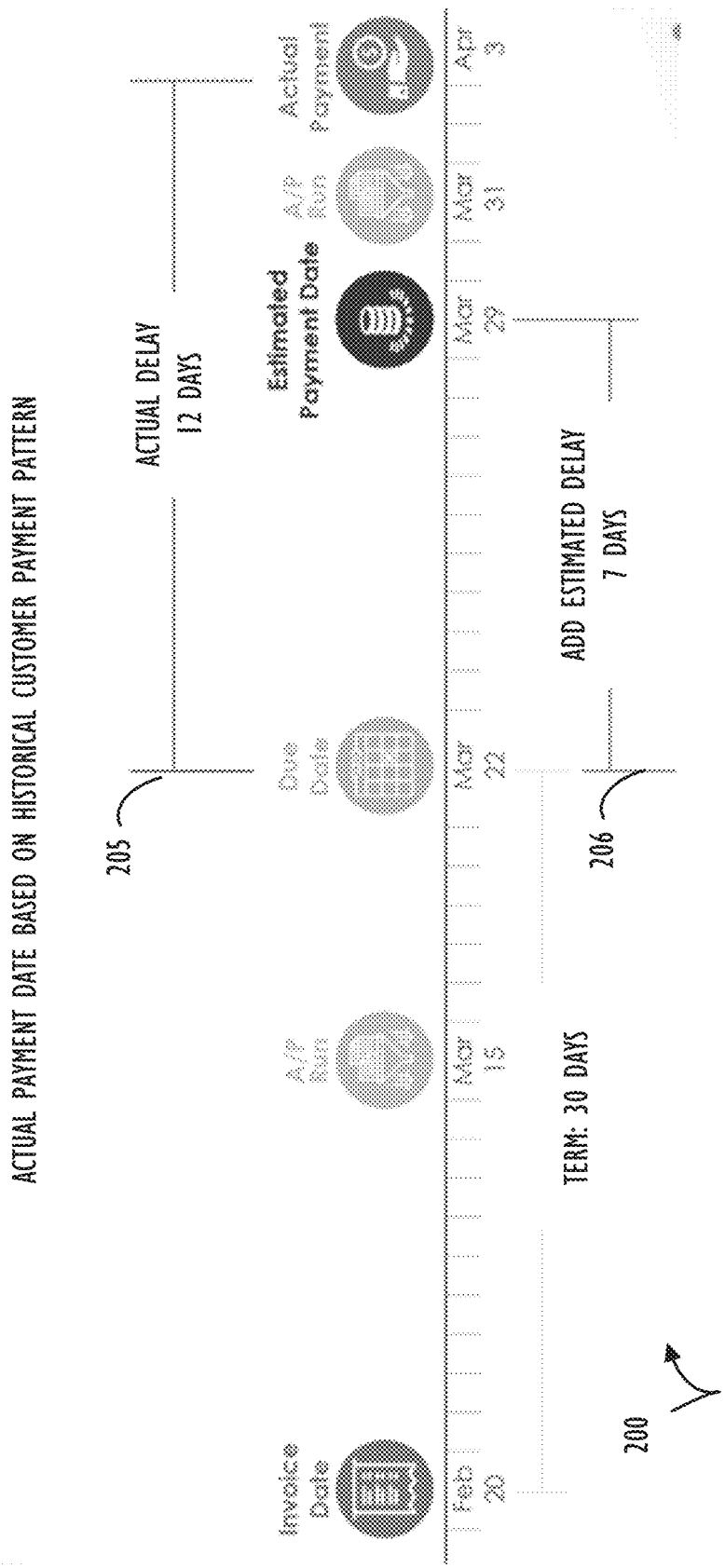
FIGS. 2A-B illustrate a timeline of one example customer payment with milestones to address estimated delays versus actual delays for an accounts receivable (A/R) system, according to one or more disclosed implementations.

Referring now to FIG. 2A, a timeline 200 is illustrated as an example of actual payment date based on historical customer payment pattern. In this example an invoice is generated on February 20 at the start of timeline 200. In this example the term of payment is 30 days (e.g., net 30) and the invoice is initially due on March 22 as indicated. March 22 also indicates the start of time periods 205 and 206. In this example, there is an ADD estimated delay of 7 days (illustrated by time period 206) from the due date of March 22 to receive payment on March 29. Also, in this example, there is an actual delay of 12 days to receive actual payment on April 3 (illustrated by time period 205). These metrics may be stored and associated with a particular customer as an indication of their historical payment behavior.

Figure 2B:
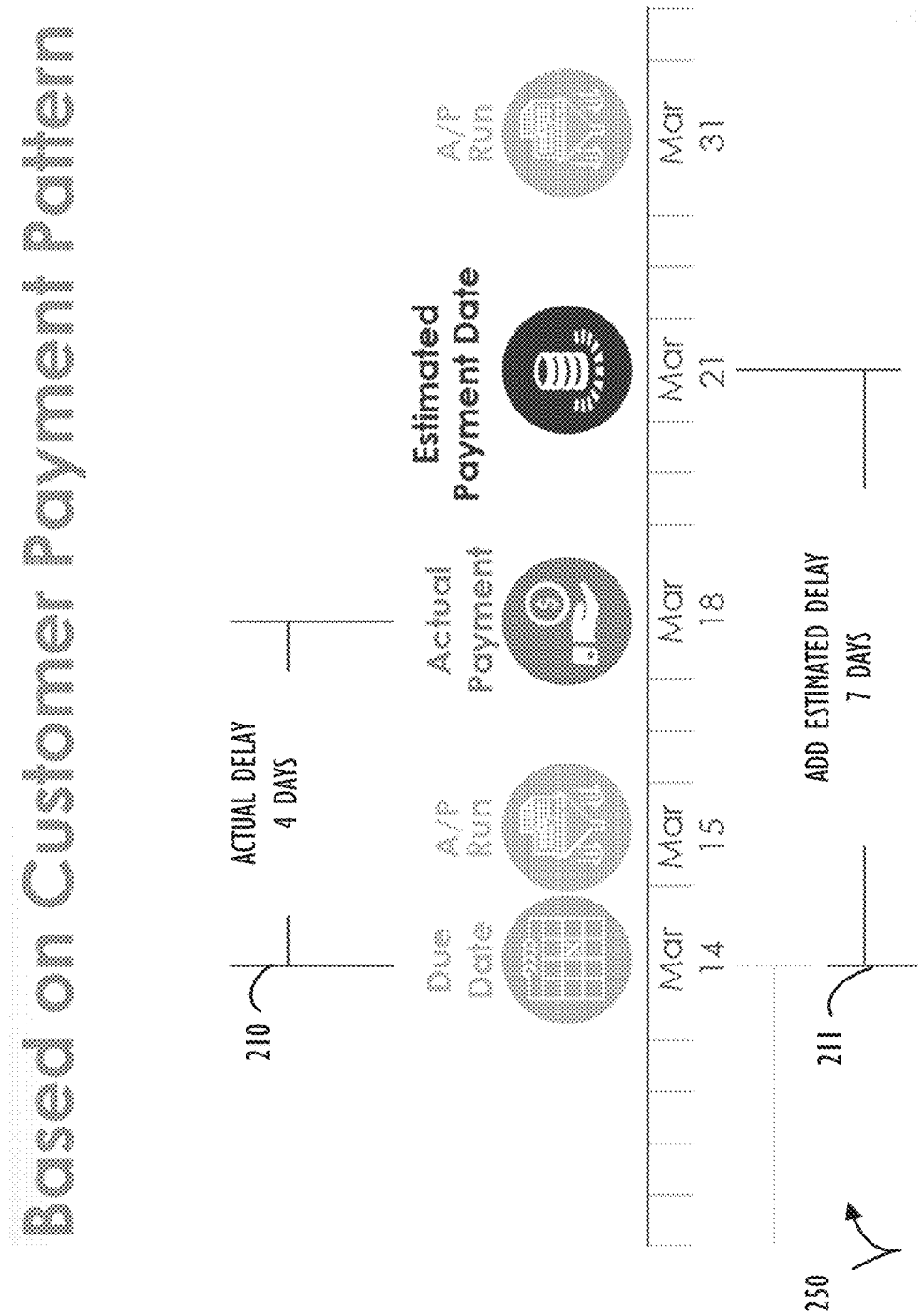

Referring now to FIG. 2B, a timeline 250 is illustrated as another example of an invoice life-cycle with payment being received having actual delay (indicated by time period 210) of less than ADD estimated delay (indicated by time period 211). This example may represent a reduction in a delay to collect invoice payment and correspondingly reduce time to obtain a response event to close the two-way event cycle of this example A/R system. This reduction may result from proactive notification to a customer as described in more detail below (See FIGS. 6 and 7).

Figure 3A:
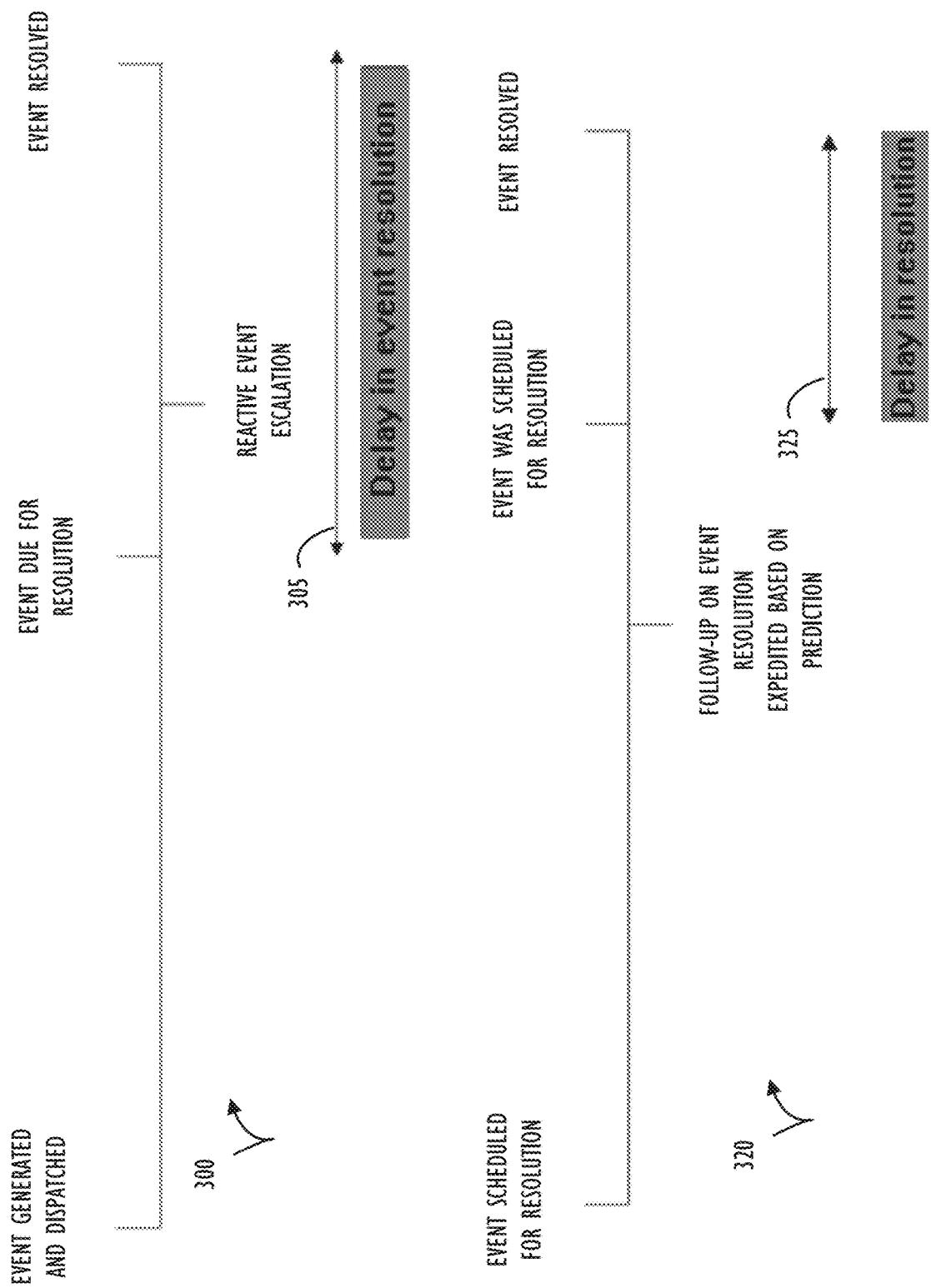
FIGS. 3A-B illustrates possible timelines for a generalized event-driven application executing on one or more computer systems, according to one or more disclosed implementations.

Referring now to FIG. 3A, timeline 300 illustrates an event cycle that begins with an event being dispatched and ends with an event being resolved. This timeline may be representative of a generic two-way event system implementation. Time period 305 represents the delay in resolution from resolution due date till event is resolved and includes an escalation occurring after the due date is missed in an effort to get the event resolved. The escalation may be a follow-up to an entity (or computer process) that is being waited on for the response event.

Timeline 320 illustrates a second event cycle that begins with an event being scheduled for resolution and again ends with the event being resolved. However, in this case, a follow-up for event resolution may take place prior to that event's scheduled resolution. This follow-up may be based on a prediction that the proposed schedule will not be met. For example, if an action associated with a response event is further associated with an actor that is historically delinquent, a prediction of tardiness may be provided to cause proactive escalation to query about the response event. As a result, delay in resolution as indicated by time period 325 may be reduced. That is, the resolution is not on-time, but it is not as delayed as it might have been without proactive escalation.

Figure 3B:
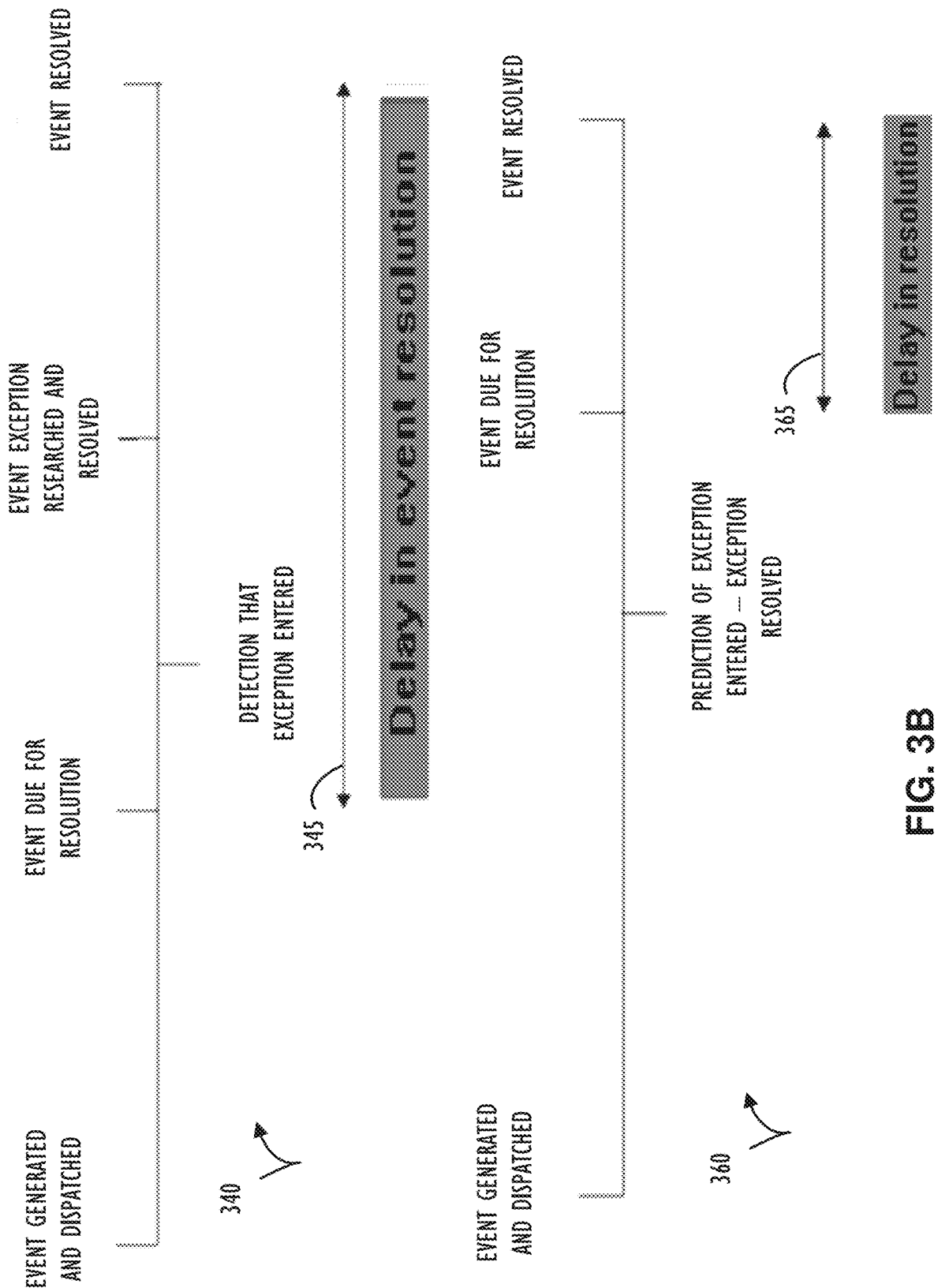

Referring now to FIG. 3B, timeline 340 illustrates a sequence of events beginning with an event being generated and dispatched and ending with an event resolution. Time period 345 illustrates a delay in event resolution based on a system that detects that an exception has been entered (e.g., reactive system). In contrast, timeline 360 illustrates a possible reduction in delay in event resolution (indicated by time period 365) by using a system that proactively predicts that an exception is going to be entered. By initiating research and resolution of a predicted exception ahead of the event due for resolution-time, overall delay to event resolution may be reduced.

Figure 4A:
FIGS. 4A-C illustrate possible timelines for an event-driven application for payment processing (e.g., an NR system), according to one or more disclosed implementations.
Figure 4B:
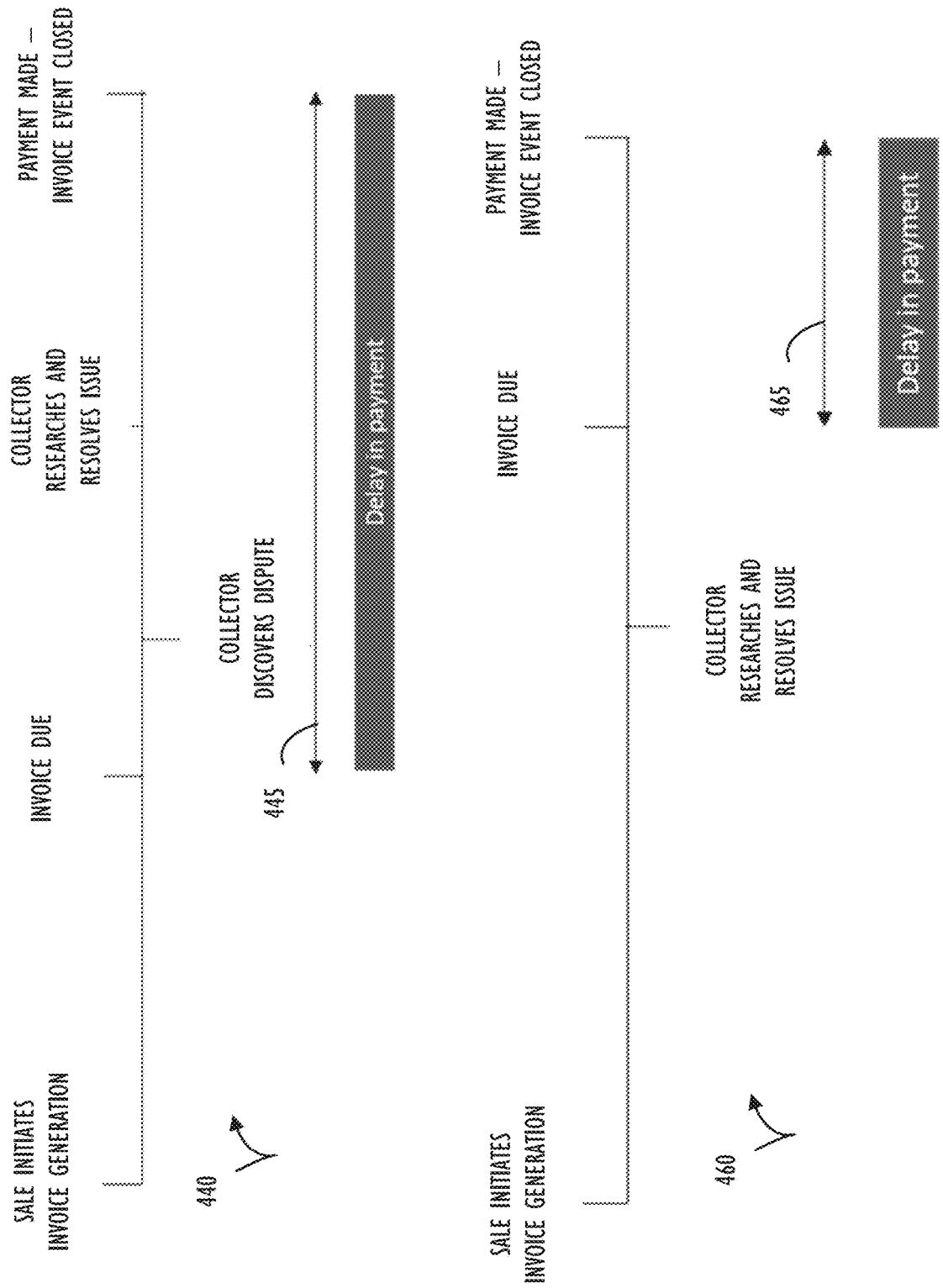
Figure 4C:
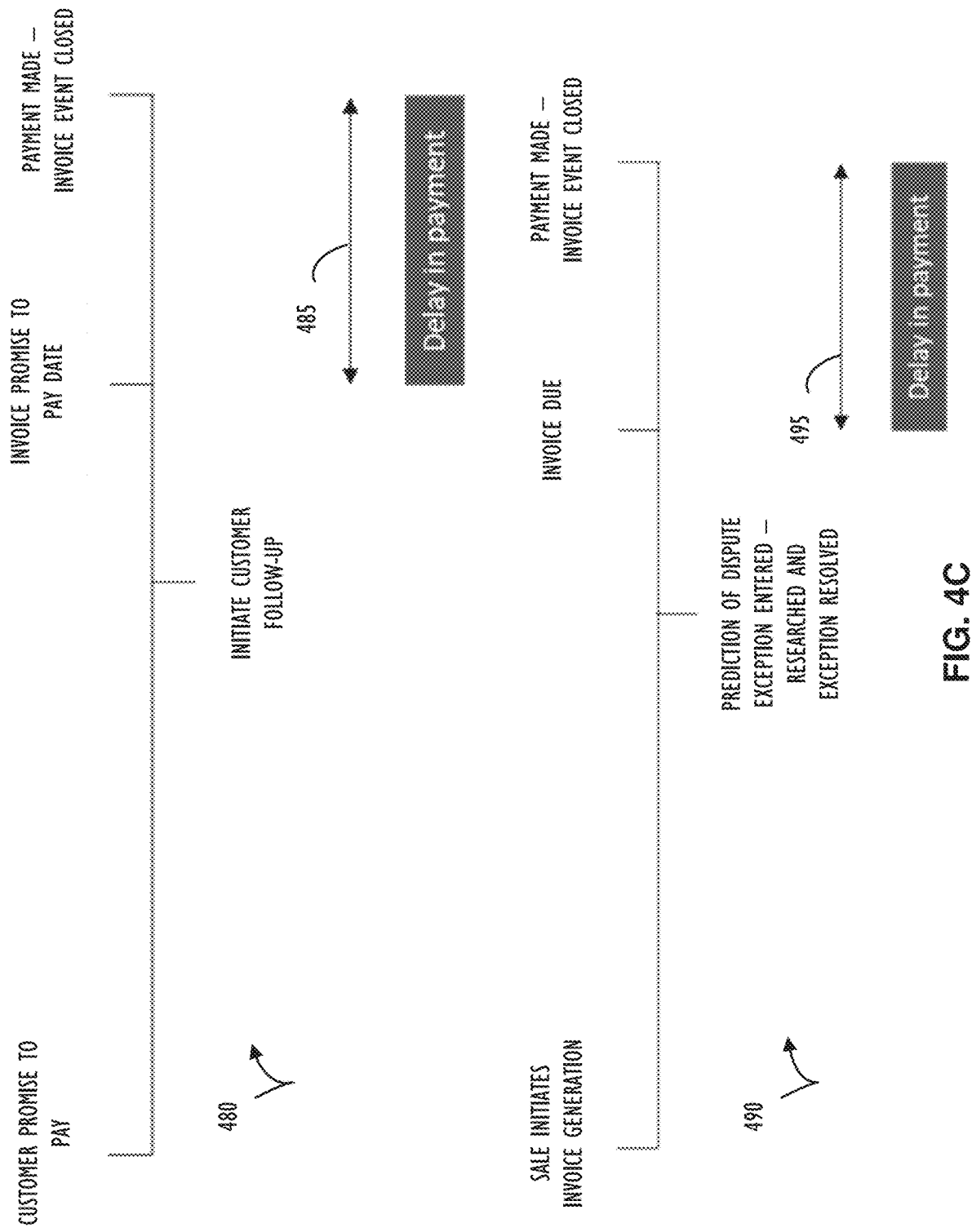

Referring now to FIGS. 4A-4C, different timelines with respect to invoice processing are presented. FIG. 4A includes timeline 400 where a follow-up is initiated in a reactive manner based on missed due date and reflects a delay in payment as indicated by time period 405. Timeline 420 of FIG. 4A illustrates an example where a follow up on a broken promise to pay results in a delay in payment as indicated by time period 425. FIG. 4B includes timeline 440 where a collector discovers a dispute after an invoice due date resulting in delay in payment as represented by time period 445. In contrast, timeline 460 illustrates a proactive research activity by a collector (ahead of invoice due date) that results in a delay in payment as indicated by time period 465. Note that proactive research may be initiated using AI/ML prediction techniques of this disclosure based on historical events having similar attributes to an event in an active life-cycle. FIG. 4C includes timeline 480 that illustrates proactive follow-up on a promise to pay date that has not yet arrived resulting in a delay in payment as indicated by time period 485. Finally, timeline 490 illustrates a proactive prediction of dispute for an invoice (again based on AI/ML techniques using historical data that aligns with this event in some manner) prior to the invoice due date and results in a delay in payment as indicated by time period 495.

Figure 5:
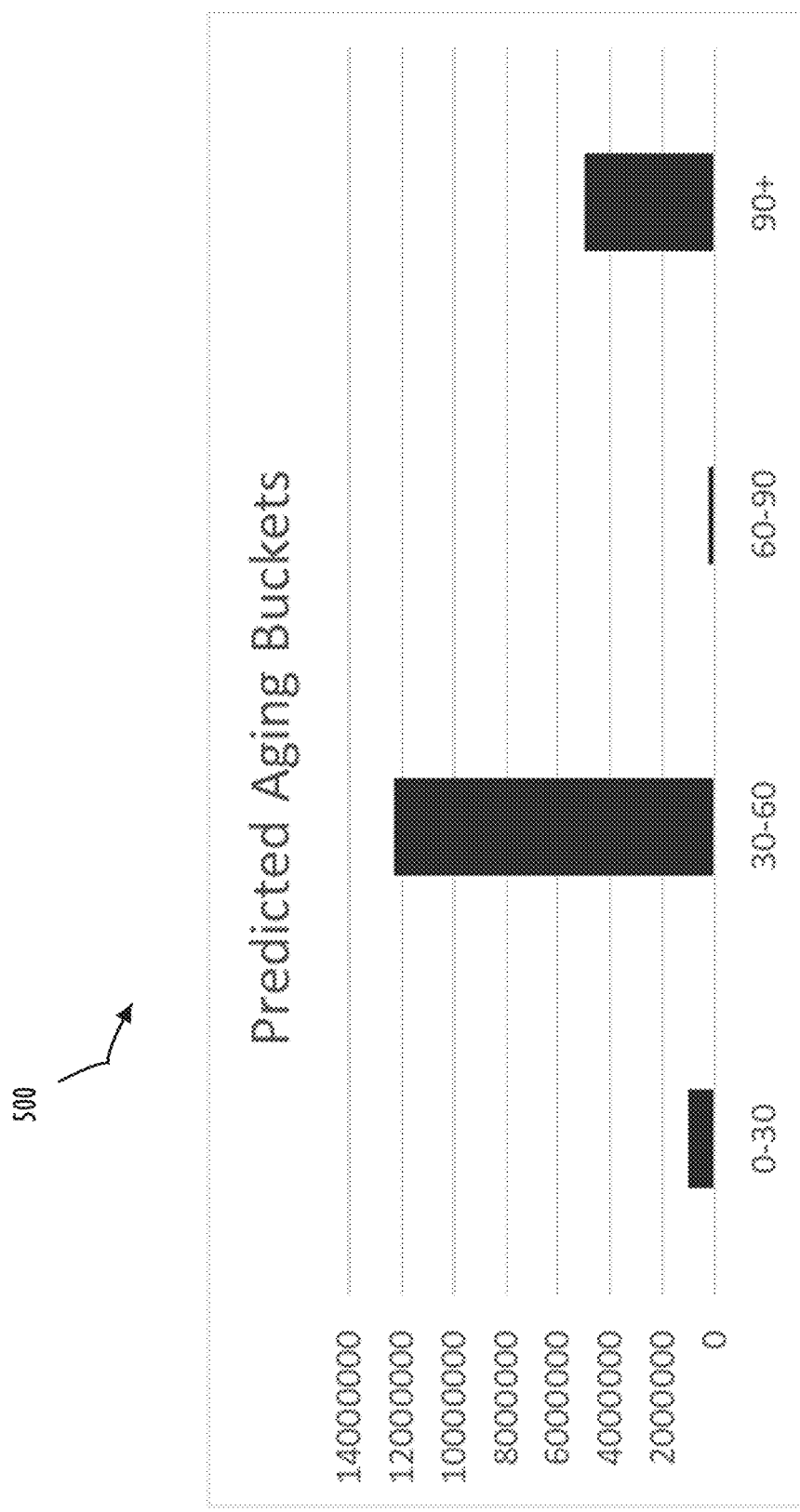
FIG. 5 illustrates potential grouping of predicted aging buckets for an A/R system, according to one or more disclosed implementations.

Referring now to FIG. 5, histogram 500 indicates that different events (e.g., invoice events) may be grouped together in different aging buckets. In the context of an A/R system, these different aging buckets may be used for prediction and escalation for collection activity. Specifically, many invoice payment schedules are based on a 30 day time period, such that, if an invoice payment is missed by a consumer (or purchaser business) it is likely that the business or consumer will not pay anything until the next 30 day cycle. Thus, the older the bucket that invoices are grouped into (particularly past 60 days), the more likely that customer will require an assertive collection action to be persuaded to resolve the outstanding debt. In the context of a help-desk system, aging buckets may be used to automatically close outstanding tickets, in part, because the longer a ticket remains open the less likely that the user originating the ticket is still interested in a resolution (or the previously applied solution corrected the issue).

Figure 6:
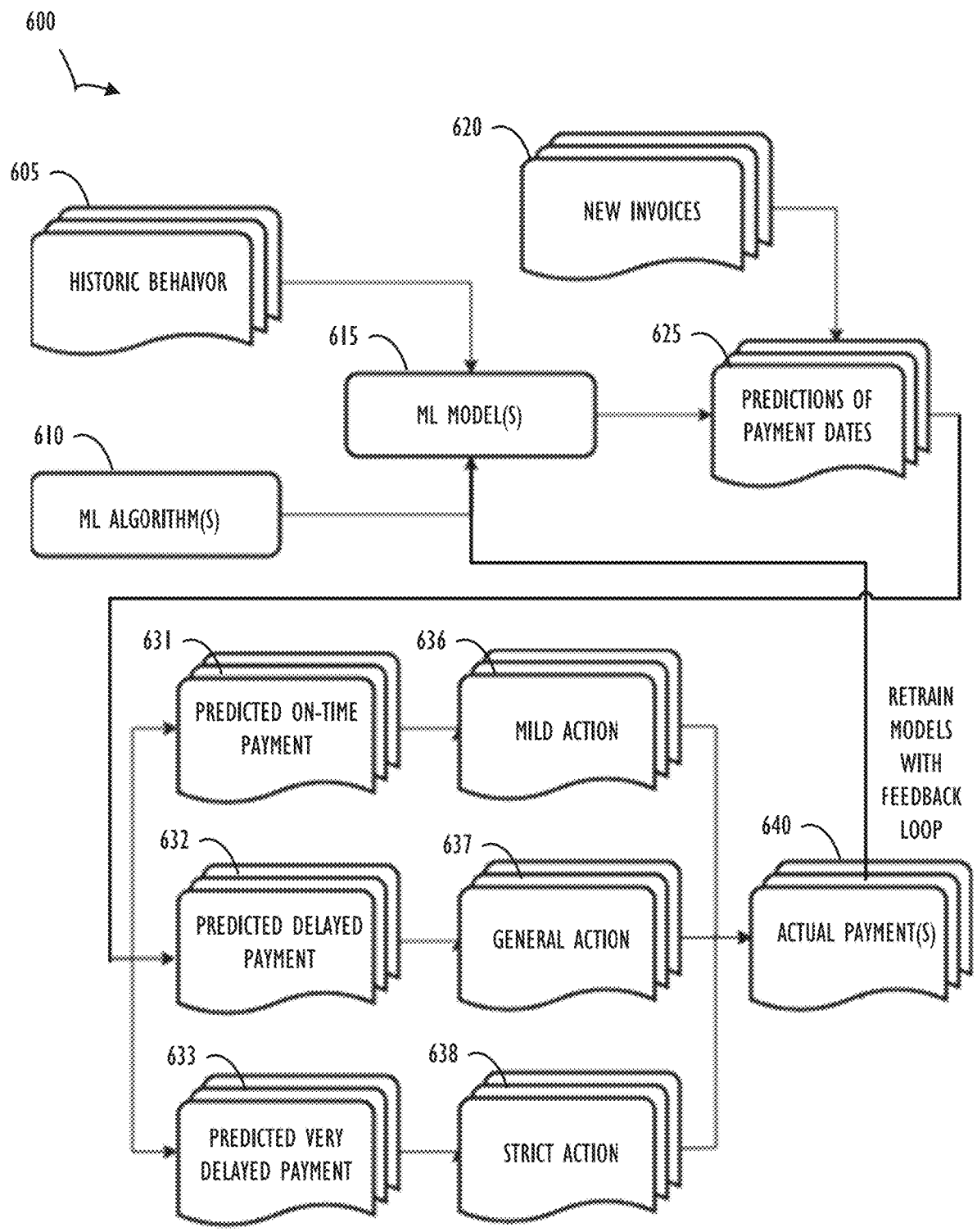
FIG. 6 illustrates flow and functional modules that may be used to implement a computer-based method for event processing with respect to an A/R system, according to one or more disclosed implementations.

Referring now to FIG. 6, a flow diagram is illustrated as an example method 600 for utilizing AI/ML techniques and historical information to form a proactive and predictive A/R system in accordance with disclosed techniques. Example method 600 further illustrates possible functional modules and interaction between those modules. Note that each illustrated functional module may internally utilize methods and techniques (not shown) to perform their part of the overall method 600.

Example method 600 begins with historical behavior 605. Historical behavior 605 may be collected as data representative of many different customers and many different invoice events. This data may be correlated and aggregated to form a repository of information for ML/AI processing. One or more ML algorithms 610 may process one or more ML models 615 to provide predictions of payment dates 625. New invoices 620 with scheduled payment dates may be included within predictions of payment dates 625. For example, with their initial due date as the initial prediction date. Flow from prediction of payment dates 625 continues to one of three outputs.

A first of the three outputs or events is represented by predicted on-time payment 631, a second is predicted delayed payment 632 (e.g., delay of under 60 days of due date), and the third is predicted very delayed payment 633 (e.g., delay of over 60 days past due date). Also, a suggestion of action may be made for each invoice. These suggested actions may be based on the correlation and analysis provided as part of example method 600. Specifically, some invoices may be processed with mild actions 636, other invoices that are at a slightly higher risk may be processed with general actions 637, and a final grouping of invoices may be processed with strict actions 638.

Each action is selected from a set of suggested actions having different severities. The suggested action is associated with a lower severity when the predicted payment time is nearer a current date and a higher severity when the predicted payment time is further from the current date. The different severities range from mild actions to general actions to strict actions with the mild actions being less severe than the general actions and the general actions being less severe than the strict actions. In general, these actions may overlap in their suggestions with higher risk and higher priority actions being more intrusive on a customer debtor. For example, a mild action may be to send an email reminder that the customer will likely see when they are sitting at their work computer. A general action could be a text messages delivered at a particular time of day to the customer's cell phone (e.g., an interruption message). A strict action may be an actual phone call to a customer or even initiation of a demand later requiring "payment or risk legal action."

Each of these types of actions are variable and there may be more than three levels in an actual implementation. In any case, the prediction engine (not shown) may be a functional module that uses prediction of payment dates 625 and other customer centric (or invoice centric) information to determine a proper proactive escalation for a particular invoice.

Actual payments 640 represent resolutions to invoice generation events and (as illustrated by a feedback loop) may contain information that may be utilized to retrain models for future use. The method might further include calculating a total amount outstanding in debts relative to the first debtor customer and providing the total amount outstanding to a collections analyst. Additionally, the method might include performing a roll-up calculation across a set of debtor customers, including the first debtor customer and one or more additional debtor customers, as part of a cash flow analysis for a supplier or a collector.

Figure 7:
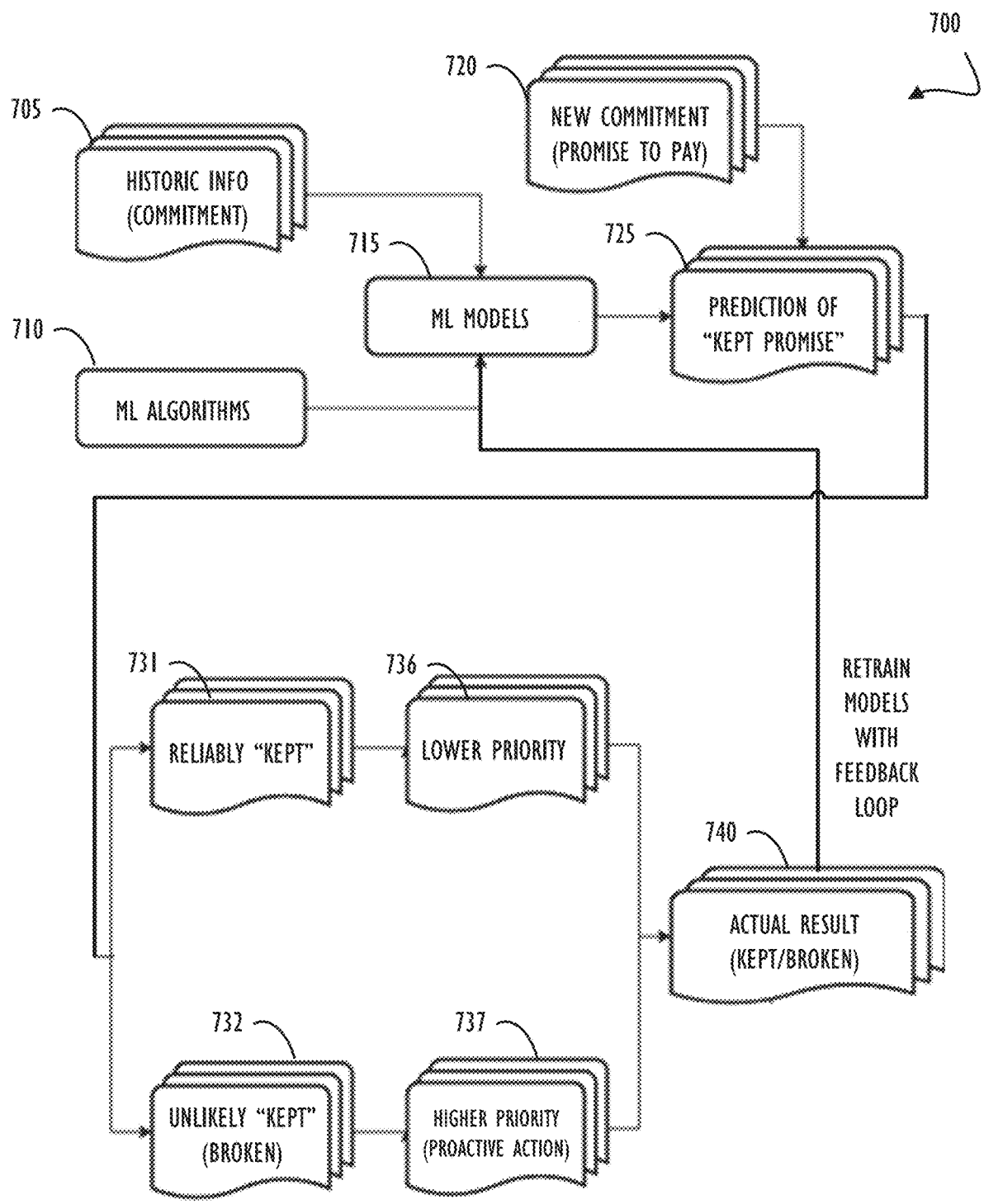
FIG. 7 illustrates alternative or additional flow and functional modules that may be used to implement a computer-based method for event prediction and processing, according to one or more disclosed implementations.

Referring now to FIG. 7, another example method 700 is illustrated to show functional modules and process flows for a prediction with respect to promises to resolve responses (e.g., from previous escalations), according to one or more disclosed implementations. Example method 700 begins at historical information 705 which may, in this example, be a previous commitment made by this customer (or a customer in a similar situation as determined by historical trends). ML algorithms 710 represent ML/AI techniques that may be used to process data and act on ML models 715 (using historical info 705 as input). Prediction of promises 725 may have as input the historical information 705 already described and may receive input of new commitments 720. Flow from prediction of promises 725 may arrive, in this example, at one of two outcomes. Namely, the promise may be expected to be reliably kept 731 or determined to be likely broken 732. This indication may result from a reliability factor associated with the customer or invoice type being processed. For example, invoices with larger amounts of money may have a higher (or lower) likelihood of being honored by different customers. As illustrated, a promise that is likely to be kept may have a lower priority 736 than suspect promises. A promise that is unlikely to be kept 732 may require proactive actions and be designated with a grouping of higher priority 737. In either case, flow continues to an actual result of kept or broken 740. Finally, as illustrated, a feedback loop from actual result 740 to ML models 715 represents that information associated with each invoice may be collected and utilized for future processing and possible alteration of (retraining) ML models 715.

Figure 8:
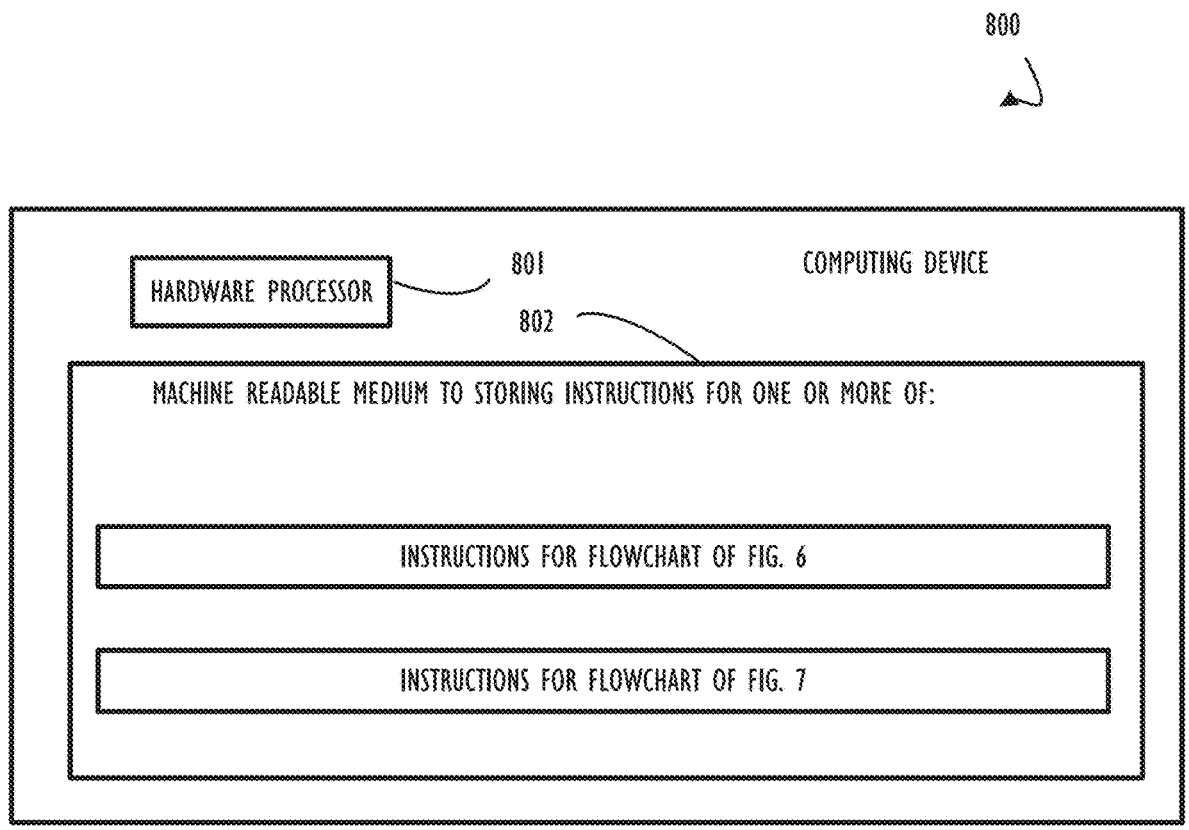
FIG. 8 is an example computing device with a hardware processor and accessible machine-readable instructions that might be used to facilitate event resolution using the example methods of FIGS. 6-7, according to one or more disclosed implementations.

FIG. 8 is an example computing device 800, with a hardware processor 801, and accessible machine-readable instructions stored on a machine-readable medium 802 that may be used to support the above discussed development and execution of an A/R system using prediction techniques, according to one or more disclosed example implementations. FIG. 8 illustrates computing device 800 configured to perform the flow of method 600 or 700 as an example. However, computing device 800 may also be configured to perform the flow of other methods, techniques, functions, or processes described in this disclosure. In this example of FIG. 8, machine-readable storage medium 802 includes instructions to cause hardware processor 801 to perform blocks 605-640 and/or 705-740 discussed above with reference to FIGS. 6 and 7 respectively.

A machine-readable storage medium, such as 802 of FIG. 8, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 9:
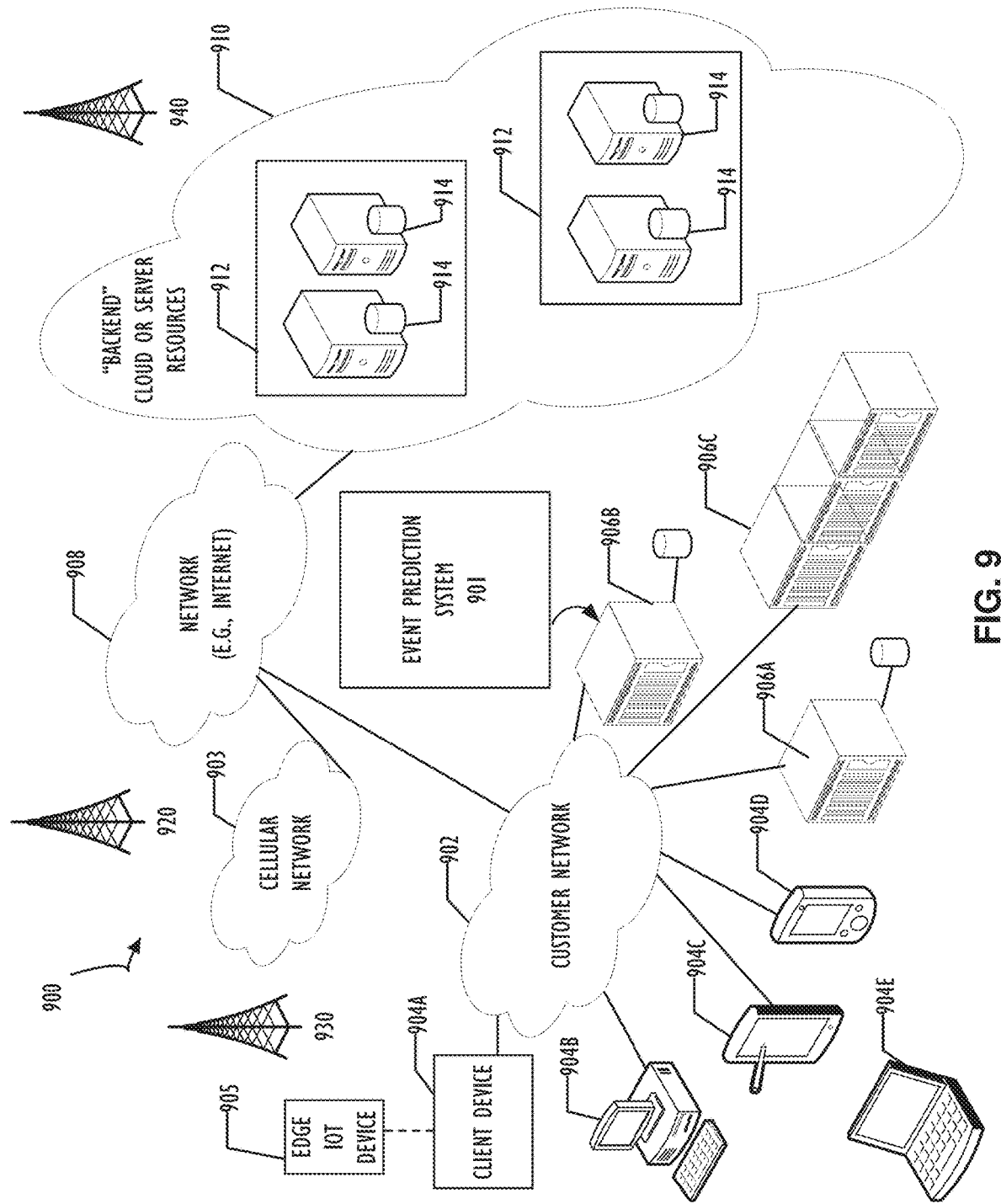
FIG. 9 illustrates a computer network infrastructure that may be used implement disclosed systems that may be used to facilitate event resolution, according to one or more disclosed implementations.

FIG. 9 represents a computer network infrastructure 900 that may be used to implement all or part of the disclosed techniques of this disclosure. For example, an event prediction system 901 may be implemented on compute resource 906B and interact with other devices of network infrastructure 900. As illustrated, network infrastructure 900 includes a set of networks where embodiments of the present disclosure may operate (e.g., components shown may execute a resultant enhanced A/R system). Network infrastructure 900 comprises a customer network 902, network 908, cellular network 903, and a cloud service provider network 910. In one embodiment, the customer network 902 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 902 represents an enterprise network that could include or be communicatively coupled to one or more local area networks (LANs), virtual networks, data centers and/or other remote networks (e.g., 908, 910). In the context of the present disclosure, customer network 902 may include multiple devices configured with the disclosed prediction processing techniques such as those described above. Also, one of the many computer storage resources in customer network 902 (or other networks shown) may be configured to store the historical information and models as discussed above.

As shown in FIG. 9, customer network 902 may be connected to one or more client devices 904A-E and allow the client devices 904A-E to communicate with each other and/or with cloud service provider network 910, via network 908 (e.g., Internet). Client devices 904A-E may be computing systems such as desktop computer 904B, tablet computer 904C, mobile phone 904D, laptop computer (shown as wireless) 904E, and/or other types of computing systems generically shown as client device 904A.

Network infrastructure 900 may also include other types of devices generally referred to as Internet of Things (IoT) (e.g., edge IOT device 905) that may be configured to send and receive information via a network to access cloud computing services or interact with a remote web browser application (e.g., to receive information from a user).

FIG. 9 also illustrates that customer network 902 includes local compute resources 906A-C that may include a server, access point, router, or other device configured to provide for local computational resources and/or facilitate communication amongst networks and devices. For example, local compute resources 906A-C may be one or more physical local hardware devices, such as the different configurations of AI/ML processing systems outlined above. Local compute resources 906A-C may also facilitate communication between other external applications, data sources (e.g., 907A and 907B), and services, and customer network 902. Local compute resource 906C illustrates a possible processing system cluster with three nodes. Of course, any number of nodes is possible, but three are shown in this example for illustrative purposes.

Network infrastructure 900 also includes cellular network 903 for use with mobile communication devices. Mobile cellular networks support mobile phones and many other types of mobile devices such as laptops etc. Mobile devices in network infrastructure 900 are illustrated as mobile phone 904D, laptop computer 904E, and tablet computer 904C. A mobile device such as mobile phone 904D may interact with one or more mobile provider networks as the mobile device moves, typically interacting with a plurality of mobile network towers 920, 930, and 940 for connecting to the cellular network 903. In the context of the current monitoring and event ingestion management, user alerts as to initiating of throttling actions may be configured to provide an end-user notification. In some implementations, this notification may be provided through network infrastructure 900 directly to a system administrators cellular phone.

Although referred to as a cellular network in FIG. 9, a mobile device may interact with towers of more than one provider network, as well as with multiple non-cellular devices such as wireless access points and routers (e.g., local compute resources 906A-C). In addition, the mobile devices may interact with other mobile devices or with non-mobile devices such as desktop computer 904B and various types of client device 904A for desired services.

FIG. 9 illustrates that customer network 902 is coupled to a network 908. Network 908 may include one or more computing networks available today, such as other LANs, wide area networks (WAN), the Internet, and/or other remote networks, in order to transfer data between client devices 904A-D and cloud service provider network 910. Each of the computing networks within network 908 may contain wired and/or wireless programmable devices that operate in the electrical and/or optical domain.

In FIG. 9, cloud service provider network 910 is illustrated as a remote network (e.g., a cloud network) that is able to communicate with client devices 904A-E via customer network 902 and network 908. The cloud service provider network 910 acts as a platform that provides additional computing resources to the client devices 904A-E and/or customer network 902. In one embodiment, cloud service provider network 910 includes one or more data centers 912 with one or more server instances 914. Each of these resources may work together with non-cloud resources to provide execution of or interface to deployed A/R system and ML models as discussed herein.

Figure 10:
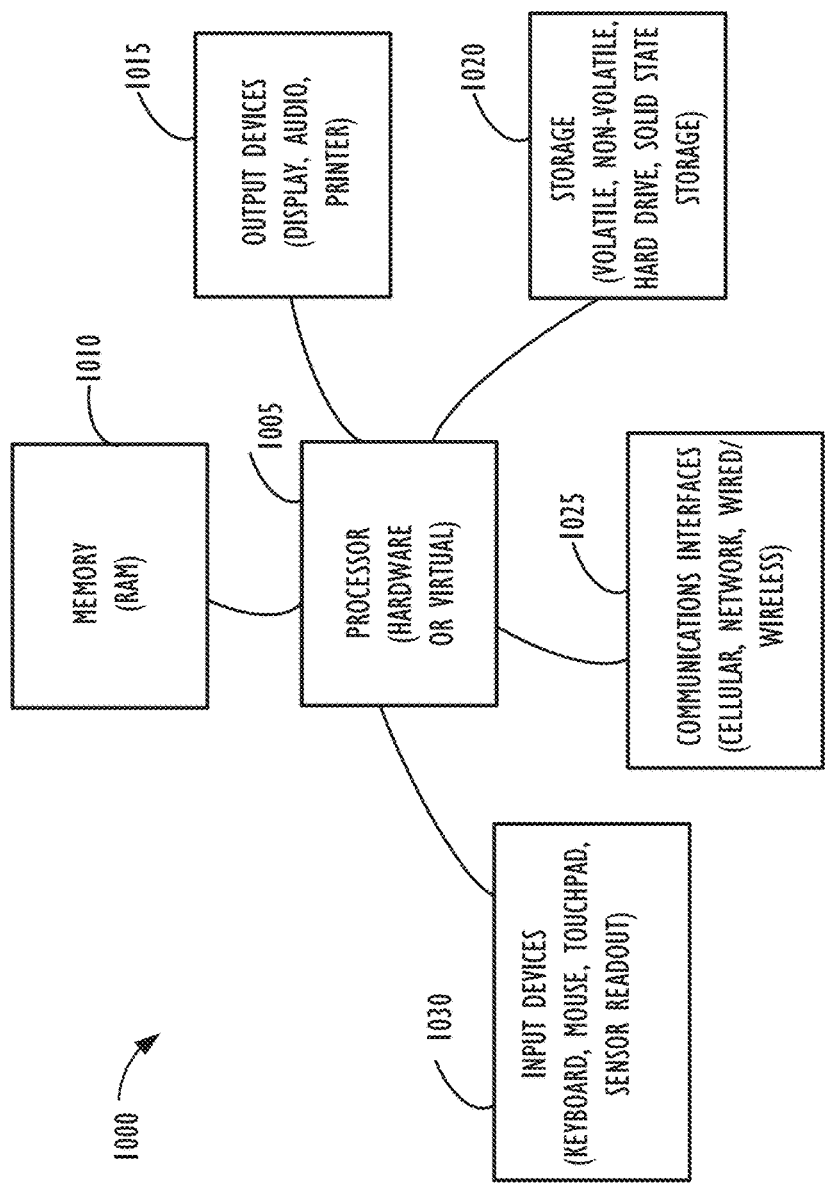
FIG. 10 illustrates an example computer device including a memory, processor, and input-output interfaces that may be used within one or more devices configured to implement the methods, systems, and techniques of this disclosure.

FIG. 10 illustrates a computer processing device 1000 that may be used to implement the functions, modules, processing platforms, execution platforms, communication devices, and other methods and processes of this disclosure. For example, computing device 1000 illustrated in FIG. 10 could represent a client device or a physical server device and include either hardware or virtual processor(s) depending on the level of abstraction of the computing device. In some instances (without abstraction), computing device 1000 and its elements, as shown in FIG. 10, each relate to physical hardware. Alternatively, in some instances one, more, or all of the elements could be implemented using emulators or virtual machines as levels of abstraction. In any case, no matter how many levels of abstraction away from the physical hardware, computing device 1000 at its lowest level may be implemented on physical hardware.

Computing device 1000 may be used to implement any of the devices that are used by developers to create an enhanced event processing system in accordance with one or more techniques of this disclosure. As also shown in FIG. 10, computing device 1000 may include one or more input devices 1030, such as a keyboard, mouse, touchpad, or sensor readout (e.g., biometric scanner) and one or more output devices 1015, such as displays, speakers for audio, or printers. Some devices may be configured as input/output devices also (e.g., a network interface or touchscreen display).

Computing device 1000 may also include communications interfaces 1025, such as a network communication unit that could include a wired communication component and/or a wireless communications component, which may be communicatively coupled to processor 1005. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 10, computing device 1000 includes a processing element such as processor 1005 that contains one or more hardware processors, where each hardware processor may have a single or multiple processor core. In one embodiment, the processor 1005 may include at least one shared cache that stores data (e.g., computing instructions) that are utilized by one or more other components of processor 1005. For example, the shared cache may be a locally cached data stored in a memory for faster access by components of the processing elements that make up processor 1005. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 10, the processing elements that make up processor 1005 may also include one or more of other types of hardware processing components, such as graphics processing units (GPU), application specific integrated circuits (ASICs), field-programmable gate arrays (FPGAs), and/or digital signal processors (DSPs).

FIG. 10 illustrates that memory 1010 may be operatively and communicatively coupled to processor 1005. Memory 1010 may be a non-transitory medium configured to store various types of data. For example, memory 1010 may include one or more storage devices 1020 that comprise a non-volatile storage device and/or volatile memory. Volatile memory, such as random-access memory (RAM), can be any suitable non-permanent storage device. The non-volatile storage devices 1020 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 1020 may be used to store overflow data if allocated RAM is not large enough to hold all working data. The non-volatile storage devices 1020 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1005. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 1005 to accomplish specific, non-generic, particular computing functions.

After the compiling process, the encoded instructions may then be loaded as computer executable instructions or process steps to processor 1005 from storage device 1020, from memory 1010, and/or embedded within processor 1005

(e.g., via a cache or on-board ROM). Processor 1005 may be configured to execute the stored instructions or process steps in order to perform instructions or process steps to transform the computing device into a non-generic, particular, specially programmed machine or apparatus. Stored data, e.g., data stored by a storage device 1020, may be accessed by processor 1005 during the execution of computer executable instructions or process steps to instruct one or more components within the computing device 1000.

A user interface (e.g., output devices 1015 and input devices 1030) can include a display, positional input device (such as a mouse, touchpad, touchscreen, or the like), keyboard, or other forms of user input and output devices. The user interface components may be communicatively coupled to processor 1005. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 1000 may comprise other components well known in the art, such as sensors, powers sources, and/or analog-to-digital converters, not explicitly shown in FIG. 10.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A computer-implemented method of managing and predicting payment events, the method comprising:
    determining, using a computing system, first historical attributes regarding payments associated with a first debtor customer;
    determining, using the computing system, second historical attributes regarding previous commitments to pay associated with the first debtor customer;
    analyzing, using the computing system, outstanding debts owed to a collector from the first debtor customer, the outstanding debts including invoice information and commitment information;
    creating, using the computing system, an event associated with the first debtor customer, the event including information derived using the first historical attributes, the second historical attributes, the invoice information, and the commitment information;
    training, using the computing system, a first machine learning algorithm to predict a payment time by correlating the first historical attributes and the invoice information;
    training, using the computing system, a second machine learning algorithm to predict a commitment outcome by correlating the second historical attributes and the commitment information;
    executing, using the computing system, the first machine learning algorithm to determine a predicted payment time associated with a related outstanding invoice of the first debtor customer and generating, using the computing system and using the first machine learning algorithm, the predicted payment time associated with the related outstanding invoice of the first debtor customer;
    executing, using the computing system, the second machine learning algorithm to determine a predicted commitment outcome associated with the related outstanding invoice of the first debtor customer and generating, using the computing system and using the second machine learning algorithm, the predicted commitment outcome associated with the related outstanding invoice of the first debtor customer;
    based on the predicted payment time generated by the first machine learning algorithm and the predicted commitment outcome generated by the second machine learning algorithm, populating, using the computing system, the event to indicate the predicted payment time and the predicted commitment outcome associated with the related outstanding invoice of the first debtor customer; and
    providing, using the computing system, the event to an event processor system to associate the predicted payment time and the predicted commitment outcome with the related outstanding invoice of the first debtor customer.

2. The computer implemented method of claim 1, further comprising:
    calculating a total amount outstanding in debts relative to the first debtor customer; and
    providing the total amount outstanding to a collections analyst.

3. The computer-implemented method of claim 1, wherein creating the event further comprises:
    creating at least one of a predicted on-time payment event, a predicted delayed payment event, or a predicted very delayed payment event, wherein the predicted delayed payment event represents payment within 60 days of a payment due date and the predicted very delayed payment represents over 60 days of delay.

4. The computer-implemented method of claim 1, wherein creating the event further comprises:
    creating the event based on an invoice being sent to the first debtor customer.

5. The computer-implemented method of claim 1, wherein creating the event further comprises:
    creating the event based on a due date of an outstanding invoice.

6. The computer-implemented method of claim 1, further comprising:
    generating a suggested action based on the event as part of the providing the event to the event processor system.

7. The computer-implemented method of claim 6, wherein the suggested action is selected from a set of suggested actions having different severities.

8. The computer-implemented method of claim 7, wherein the suggested action is associated with a lower severity when the predicted payment time is nearer a current date and a higher severity when the predicted payment time is further from the current date.

9. The computer-implemented method of claim 7, wherein the different severities range from mild actions to general actions to strict actions with the mild actions being less severe than the general actions and the general actions being less severe than the strict actions.

10. A non-transitory computer readable medium comprising computer executable instructions that, when executed by one or more processing units, cause the one or more processing units to:
   determine first historical attributes regarding payments associated with a first debtor customer;
   determine second historical attributes regarding previous commitments to pay associated with the first debtor customer;
   analyze outstanding debts owed to a collector from the first debtor customer, the outstanding debts including invoice information and commitment information;
   create an event associated with the first debtor customer, the event including information derived using the first historical attributes, the second historical attributes, the invoice information, and the commitment information;
   train a first machine learning algorithm to predict a payment time by correlating the first historical attributes and the invoice information;
   train a second machine learning algorithm to predict a commitment outcome by correlating the second historical attributes and the commitment information;
   execute the first machine learning algorithm to determine a predicted payment time associated with a related outstanding invoice of the first debtor customer and generate, using the first machine learning algorithm, the predicted payment time associated with the related outstanding invoice of the first debtor customer;
   execute the second machine learning algorithm to determine a predicted commitment outcome associated with the related outstanding invoice of the first debtor customer and generate, using the second machine learning algorithm, the predicted commitment outcome associated with the related outstanding invoice of the first debtor customer;
   based on the predicted payment time generated by the first machine learning algorithm and the predicted commitment outcome generated by the second machine learning algorithm, populate the event to indicate the predicted payment time and the predicted commitment outcome associated with the related outstanding invoice of the first debtor customer; and
   provide the event to an event processor system to associate the predicted payment time and the predicted commitment outcome with the related outstanding invoice of the first debtor customer.

11. The non-transitory computer readable medium of claim 10, wherein the instructions further comprise instructions to cause the one or more processing units to:
   calculate a total amount outstanding in debts relative to the first debtor customer; and
   provide the total amount outstanding to a collections analyst.

12. The non-transitory computer readable medium of claim 10, wherein the instructions to create the event further comprise:
   instructions to create the event based on an invoice being sent to the first debtor customer.

13. The non-transitory computer readable medium of claim 10, wherein the instructions to create the event further comprise:
   instructions to create the event based on a due date of an outstanding invoice.

14. A computer system comprising:
   one or more processors;
   a non-transitory memory communicatively coupled to the one or more processors and storing instructions executable by the one or more processors to cause the one or more processors to:
      determine first historical attributes regarding payments associated with a first debtor customer;
      determine second historical attributes regarding previous commitments to pay associated with the first debtor customer;
      analyze outstanding debts owed to a collector from the first debtor customer, the outstanding debts including invoice information and commitment information;
      create an event associated with the first debtor customer, the event including information derived using the first historical attributes, the second historical attributes, the invoice information, and the commitment information;
      train a first machine learning algorithm to predict a payment time by correlating the first historical attributes and the invoice information;
      train a second machine learning algorithm to predict a commitment outcome by correlating the second historical attributes and the commitment information;
      execute the first machine learning algorithm to determine a predicted payment time associated with a related outstanding invoice of the first debtor customer and generate, using the first machine learning algorithm, the predicted payment time associated with the related outstanding invoice of the first debtor customer;
      execute the second machine learning algorithm to determine a predicted commitment outcome associated with the related outstanding invoice of the first debtor customer and generate, using the second machine learning algorithm, the predicted commitment outcome associated with the related outstanding invoice of the first debtor customer;
      based on the predicted payment time generated by the first machine learning algorithm and the predicted commitment outcome generated by the second machine learning algorithm, populate the event to indicate the predicted payment time and the predicted commitment outcome associated with the related outstanding invoice of the first debtor customer; and
      provide the event to an event processor system to associate the predicted payment time and the predicted commitment outcome with the related outstanding invoice of the first debtor customer.

15. The computer system of claim 14, wherein the instructions further comprise instructions to cause the one or more processors to:
   calculate a total amount outstanding in debts relative to the first debtor customer; and
   provide the total amount outstanding to a collections analyst.

16. The computer system of claim 14, wherein the instructions to create the event further comprise:

instructions to create the event based on an invoice being sent to the first debtor customer.

17. The computer system of claim 14, wherein the instructions to create the event further comprise:
instructions to create the event based on a due date of an outstanding invoice.

18. The computer implemented method of claim 1, further comprising:
performing a roll-up calculation across a set of debtor customers, the set of debtor customers including the first debtor customer and one or more additional debtor customers, as part of a cash flow analysis for the collector.

19. The computer implemented method of claim 1, further comprising:
determining an actual payment time and an actual commitment outcome associated with the related outstanding invoice of the first debtor customer; and
retraining the first machine learning algorithm based on the actual payment time associated with the related outstanding invoice of the first debtor customer; and
retraining the second machine learning algorithm based on the actual commitment outcome associated with the related outstanding invoice of the first debtor customer.

* * * * *